(12) United States Patent
Nazarian et al.

(10) Patent No.: US 10,992,454 B2
(45) Date of Patent: Apr. 27, 2021

(54) BLOCKCHAIN CONFIGURATION FOR SECURE CONTENT DELIVERY

(71) Applicant: Disney Enterprises, Inc., Burbank, CA (US)

(72) Inventors: Artin Nazarian, Tujunga, CA (US); Mark Arana, West Hills, CA (US); Derek L. Prestegard, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 380 days.

(21) Appl. No.: 15/986,729

(22) Filed: May 22, 2018

(65) Prior Publication Data

US 2019/0238317 A1    Aug. 1, 2019

Related U.S. Application Data

(60) Provisional application No. 62/624,058, filed on Jan. 30, 2018.

(51) Int. Cl.

| | | |
|---|---|---|
| *H04L 9/06* | (2006.01) | |
| *H04L 9/30* | (2006.01) | |
| *H04L 9/08* | (2006.01) | |
| *H04L 9/14* | (2006.01) | |
| *G06F 21/60* | (2013.01) | |
| *G06F 21/16* | (2013.01) | |
| *H04L 9/32* | (2006.01) | |

(52) U.S. Cl.
CPC ............ *H04L 9/0637* (2013.01); *G06F 21/16* (2013.01); *G06F 21/602* (2013.01); *H04L 9/088* (2013.01); *H04L 9/0822* (2013.01); *H04L 9/0825* (2013.01); *H04L 9/0866* (2013.01); *H04L 9/14* (2013.01); *H04L 9/30* (2013.01); *H04L 9/3213* (2013.01); *H04L 9/3239* (2013.01); *G06F 2221/0737* (2013.01); *H04L 2209/38* (2013.01); *H04L 2209/60* (2013.01)

(58) Field of Classification Search
CPC ..... H04L 9/0637; H04L 9/088; H04L 9/3239; H04L 9/30; H04L 9/0866; H04L 9/14; H04L 9/0825; H04L 9/3213; H04L 9/0822; H04L 2209/38; H04L 2209/60; G06F 21/602; G06F 21/16; G06F 2221/0737; G06F 21/10; G06F 21/64
See application file for complete search history.

(56) References Cited

U.S. PATENT DOCUMENTS

| | | | |
|---|---|---|---|
| 9,990,504 B1 * | 6/2018 | Chapman | H04L 9/0643 |
| 10,419,209 B1 * | 9/2019 | Griffin | H04L 9/006 |
| 2017/0116693 A1 * | 4/2017 | Rae | H04L 9/3236 |

(Continued)

*Primary Examiner* — Khoi V Le
(74) *Attorney, Agent, or Firm* — Farjami & Farjami LLP

(57) ABSTRACT

A process receives, from a registration server associated with a content playback environment, a playback system identifier and a public key. The playback system identifier and the public key correspond to a playback system. Further, the process generates a blockchain corresponding to a content identifier such that a block is established to correspond to the playback system identifier. In addition, the process encrypts, with the processor according to a content encryption key, content associated with the content identifier. The process also encrypts, with the public key, the content encryption key.

15 Claims, 10 Drawing Sheets

(56) References Cited

U.S. PATENT DOCUMENTS

2018/0115416 A1* 4/2018 Diehl .................... H04L 9/0838
2019/0028278 A1* 1/2019 Gilson ................ G06F 12/1408
2019/0207768 A1* 7/2019 Hardy .................. H04L 63/123

* cited by examiner

BLOCKCHAIN CONFIGURATION FOR SECURE CONTENT DELIVERY

RELATED APPLICATIONS

This application claims priority to U.S. Provisional Patent Application Ser. No. 62/624,058, filed on Jan. 30, 2018, entitled BLOCKCHAIN CONFIGURATION FOR SECURE CONTENT DELIVERY, which is hereby incorporated by reference in its entirety.

BACKGROUND

1. Field

This disclosure generally relates to the field of data content. More particularly, the disclosure relates to the secure delivery of content.

2. General Background

Current configurations allow audio and/or video content to be delivered by a content producer/distributor to a content playback environment (e.g., a theater) through electronic means via a computerized network. Various security mechanisms have been implemented to eliminate the potential for piracy of such content while in transit to the intended destination, and after the content has been delivered to the intended destination. But such security mechanisms are often reactive rather than preventative. For example, watermarking configurations insert a watermark into content to track piracy after the piracy has already occurred. As a result, current configurations do not adequately prevent piracy.

SUMMARY

In one aspect, a computer program product comprises a non-transitory computer readable storage device having a computer readable program stored thereon. The computer readable program when executed on a computer causes the computer to receive, from a registration server associated with a content playback environment, a playback system identifier and a public key. The playback system identifier and the public key correspond to a playback system. Further, the computer is caused to generate a blockchain corresponding to a content identifier such that a block is established to correspond to the playback system identifier. In addition, the computer is caused to encrypt, with the processor according to a content encryption key, content associated with the content identifier. The computer is also caused to encrypt, with the public key, the content encryption key.

In another aspect, a computer program product comprises a non-transitory computer readable storage device having a computer readable program stored thereon. The computer readable program when executed on a computer causes the computer to generate, with a processor, a blockchain corresponding to a content identifier such that a block is established to correspond to a playback system identifier. Further, the computer is caused to encrypt, with the processor according to a public key of a content distribution system, registration data corresponding to a playback system corresponding to the playback system identifier. In addition, the computer is caused to register, with the processor, the encrypted registration data in the blockchain. The computer is also caused to encrypt, with the processor according to a public key of the playback system, content corresponding to the content identifier. Further, the computer is caused to receive, at the blockchain from the playback system, an encrypted license request for the content. The license request is encrypted according to the public key of the content distribution system. In addition, the computer is caused to decrypt, with the processor, the encrypted license request at the blockchain. The computer is also caused to grant, with the processor, a license to the playback system for playback of the content.

In yet another aspect, a computer program product comprises a non-transitory computer readable storage device having a computer readable program stored thereon. The computer readable program when executed on a computer causes the computer to receive, with the processor, one or more playback system identifiers. Further, the computer is caused to generate, with the processor, a playback system identifier blockchain. In addition, the computer is caused to register, with the processor, the one or more playback system identifiers in the playback system identifier blockchain. The computer is also caused to generate, with the processor, a plurality of content blockchains that each corresponds to a content title such that a server associated with a playback system generates transactions in a corresponding content block chain of the plurality of content blockchains for playback of a corresponding content title. The playback system corresponds to a registered playback system identifier in the one or more registered playback system identifiers.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A blockchain configuration is provided to deliver content securely through a computerized network and maintain the security of the content at the intended destination after the aforementioned delivery. In contrast with previous configurations, the blockchain configuration verifies that the content is received at the intended destination prior to allowing playback of the content at that destination. Further, the blockchain configuration has an automated auditing mechanism that tracks playback of the content at the destination to ensure that the quantity of playbacks is accurately recorded. Therefore, piracy by the intended recipient, in the form of a greater quantity of actual playbacks than reported playbacks, is prevented.

Figure 1:
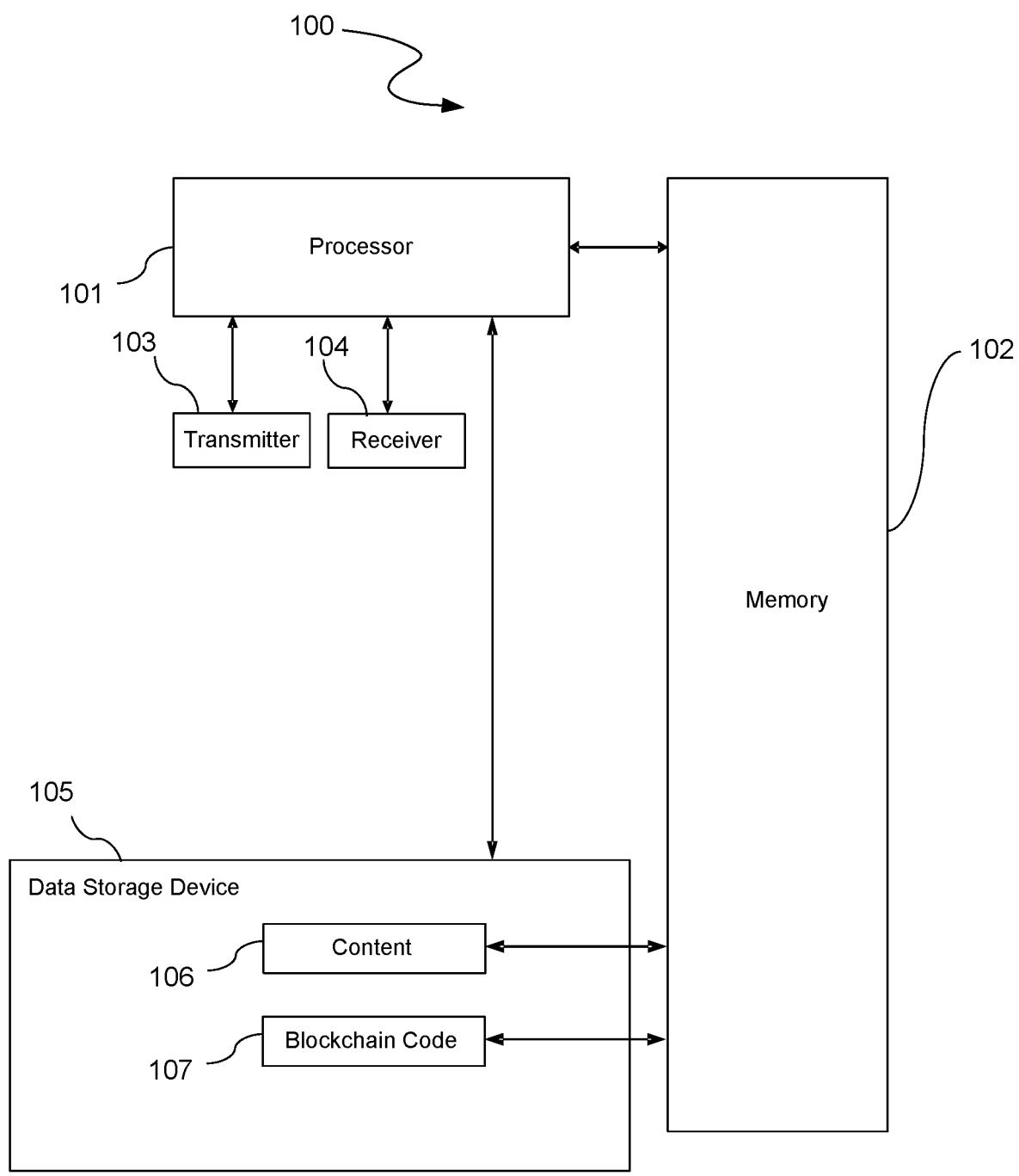
FIG. 1 illustrates a block diagram of the internal components of a content distribution server that may be used by a content producer/distributor to deliver content securely via a blockchain.

FIG. 1 illustrates a block diagram of the internal components of a content distribution server 100 that may be used by a content producer/distributor to deliver content securely via a blockchain. The content distribution server 100 may have a processor 101, a memory 102, a transmitter 103, a receiver 104, and a data storage device 105.

Further, the data storage device 105 may store content 106 and blockchain code 107. Examples of the content 106 include, but are not limited to, movies, television shows, documentaries, video games, music, advertisements, etc. The processor 101 may execute the blockchain code 107 to generate a blockchain that uniquely corresponds to the content 106. For example, the processor 101 uses the blockchain code 107 to generate a first blockchain corresponding to movie A and a second, distinct blockchain corresponding to movie B.

Even though the content distribution server 100 establishes a blockchain, mining (i.e., addition of new blocks and/or transactions within the blocks) may be performed by other computing devices within a computerized network (centralized or decentralized).

In addition, the content distribution server 100 uses the processor 101 to send the content 106, associated with a particular blockchain, securely via the transmitter 103 to an intended playback environment (e.g., a theater). The transmitter 103 is also used by the processor 101 to communicate with the playback environment (including associated devices that may be remote from the playback environment) regarding updates to the blockchain. Further, the receiver 104 is used by the processor 101 to receive updates to the blockchain performed by the playback environment (including associated devices that may be remote from the playback environment).

Figure 2:
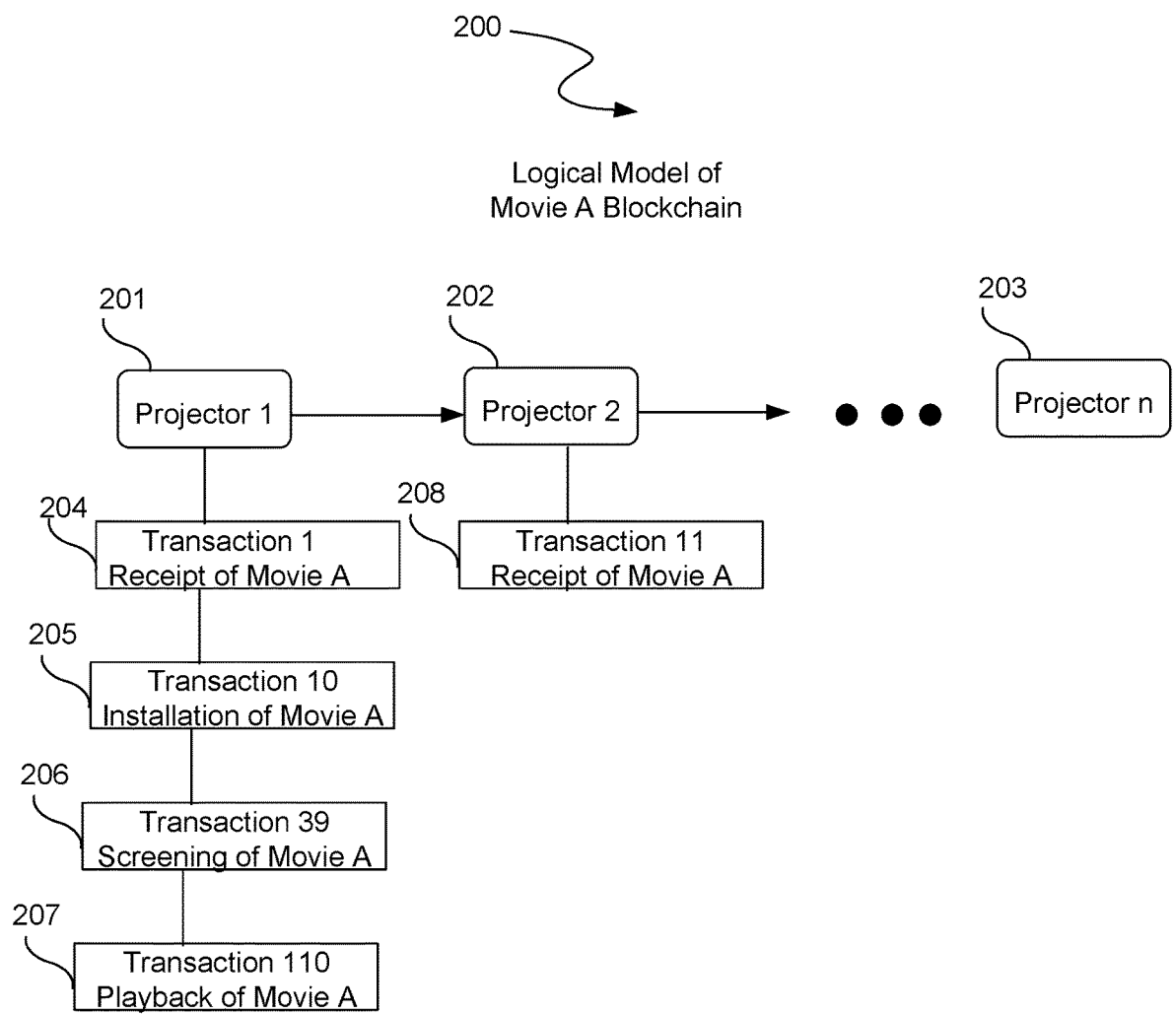
FIG. 2 illustrates an example of a logical model of a blockchain generated by the processor by executing the blockchain code illustrated in FIG. 1.

FIG. 2 illustrates an example of a logical model of a blockchain 200 generated by the processor 101 by executing the blockchain code 107 illustrated in FIG. 1. The logical model establishes a block for each projector in one content playback environment or across multiple playback environments. For example, a block 201 may be established for a first projector 201 in one movie theater, while a block 202 may be established for a second projector 202 in a different movie theater. Accordingly, a block may be established in the logical model of the blockchain 200 for n projectors (e.g., projectors 201-203) to correspond with each projector performing playback of movie A. The term "projector" is used herein for ease of illustration with respect to the content playback environment being a theater; instead, the phrase "playback device" or "playback system" may be used with respect to content playback environments that perform playback without use of a projector.

In one aspect, the logical model of the blockchain 200 also groups each transaction corresponding to a projector with that projector. For example, a series of transactions 204-207 are grouped with the first projector 201 in the blockchain 200 even though all of those transactions did not necessarily occur before transactions associated with the second projector 202. Therefore, from a logical model perspective, transactions associated with a particular projector may be searched.

In contrast, previous configurations did not store transactions associated with content for a particular projector let alone provide search ability of those transactions on a per-projector basis. Accordingly, the functionality of a computer, such as content distribution server 100 (FIG. 1), is improved as a result of an increase in the search speed of transactions corresponding to the secure delivery of the content 106.

Figure 3:
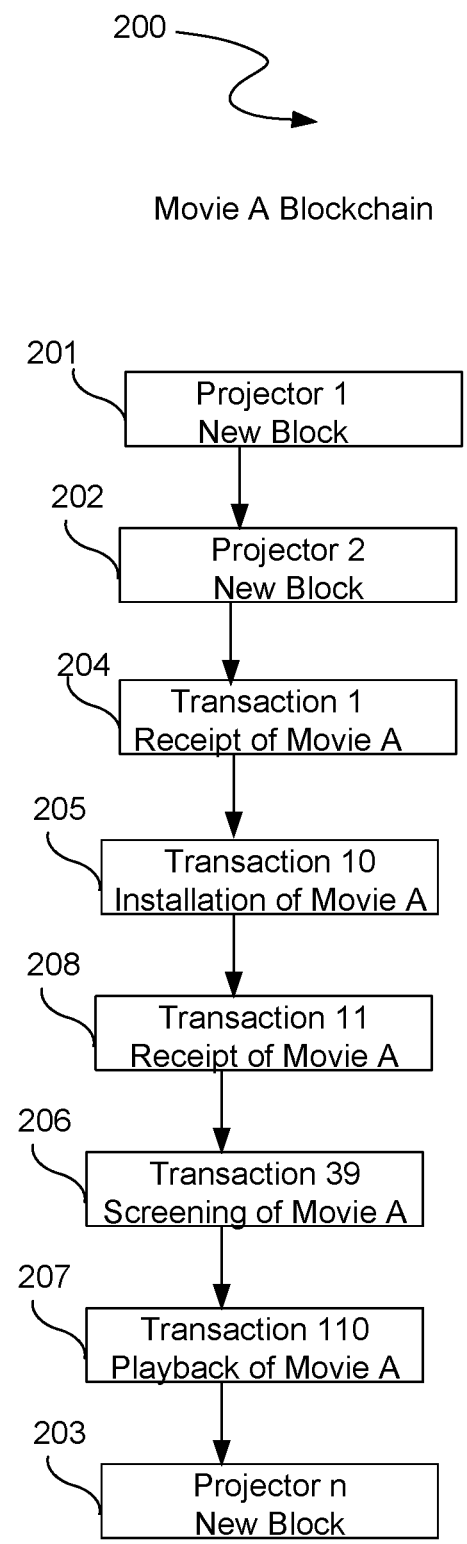
FIG. 3 illustrates an example of the blockchain generated according to its mining sequence.

FIG. 3 illustrates an example of the blockchain 200 generated according to its mining sequence. For example, the content distribution server 100 (FIG. 1) may generate blocks 201 and 202 to correspond, respectively, to two projectors in a theater. Blocks 204 and 205 may be mined to correspond to sequential transactions (intervening transactions not illustrated for ease of illustration) associated with the first projector. Even though block 206 corresponds to a transaction associated with the first projector, block 208 is added to the blockchain 200 before block 206 because the tenth transaction occurred prior to the eleventh transaction. The blocks 202 and 204-207 may be mined by the theater. The content distribution server 100 may monitor the blockchain 200 for updates corresponding to content associated with each projector.

Further, the content distribution server 100 may subsequently add a new block to the blockchain 200. For example, the block 203 may be added to the blockchain 200 for the nth projector after transactions are performed for existing projectors. In other words, all of the blocks for each projector do not have to be established at the outset.

In one aspect, the payload (i.e., the content delivered for playback) itself is stored in one or more blocks of the blockchain 200. In another aspect, the payload is sent by the content distribution server 100 (FIG. 1) to each projector for local storage at the theater. Alternatively, the payload may be sent in a single instance to the theater so that the theater (e.g., via a theater server) provides the payload to each projector upon request for playback.

Figure 4:
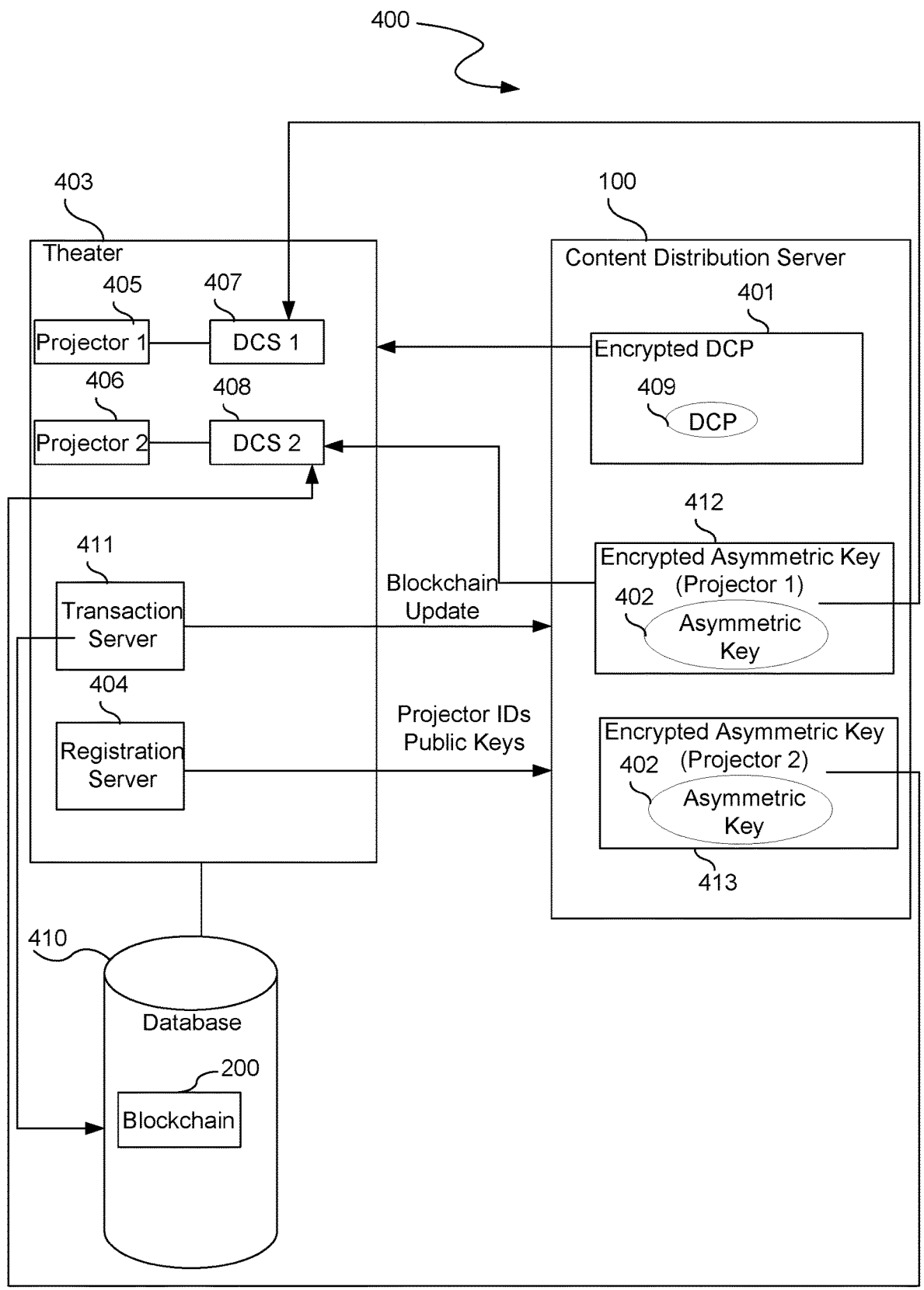
FIG. 4 illustrates a blockchain content distribution system ("CDS") that may be used by the content distribution server illustrated in FIG. 1 to unlock access to an encrypted digital cinema package ("DCP").

FIG. 4 illustrates a blockchain CDS 400 that may be used by the content distribution server 100 illustrated in FIG. 1 to unlock access to an encrypted DCP 401. In one aspect, the content distribution server 100 generates a DCP 409 that includes video and/or audio, subtitles, etc. Further, the content distribution server 100 may use a content encryption key ("CEK") such as, for example, an asymmetric key 402 to encrypt the DCP 409 as encrypted DCP 401.

The content distribution server 100 may generate the blockchain 200 illustrated in FIGS. 2 and 3 to correspond with a content identifier for the content 106. Based upon projector identifiers received from a registration server 404 located at, or in operable communication with, a theater 403, the content distribution server 100 establishes a quantity of blocks for the blockchain 200. For example, the theater 403 may send projector ID no. 1 associated with a first projector 405 and projector ID no. 2 associated with a second projector 406 to the content distribution server 100. Each projector may have a corresponding digital cinema server ("DCS") that provides content for playback (e.g., DCS 407 corresponding to projector 405 and DCS 408 corresponding to projector 406). In addition, the registration server 404 may send the public keys for the projectors—as maintained by each corresponding DCS—to the content distribution server 100. Further, the content distribution server 100 may encrypt the asymmetric key 402 according to each public key. As a result, the corresponding private keys of the public-private key pairs may only be used by the respective projectors (e.g., via a DCS) to decrypt the encrypted asymmetric keys 412 and 413 corresponding to projectors 405 and 406. In other words, the same asymmetric key 402 may be encrypted differently based upon a particular projector encryption key so that only that projector may obtain the asymmetric key 402.

Accordingly, in one aspect, the content distribution server 100 may send only one encrypted version of the DCP 401 and multiple encrypted versions of the asymmetric key 402 (depending on the public key associated with a particular projector). Further, in another aspect, the content distribution server 100 first sends the encrypted DCP 401 to the theater 403 and sends the encrypted version of a particular public key corresponding to a projector only after one or more conditions are met. For example, the conditions may be that the theater 403 received the encrypted DCP 401, installed the DCP 409 at a DCS, and/or attempted a first playback (screening) of the DCP 409. Based upon one or more of the aforementioned conditions being met, as determined by the content distribution server 100 monitoring transactions within the blockchain 100, the content distribution server 100 may then send an encrypted version of the asymmetric key 402 that may be decrypted by the DCS associated with the projector that met the aforementioned conditions. In another aspect, code may be built into the blockchain 200 itself (e.g., a smart contract) to automatically monitor the fulfillment of the aforementioned conditions.

In one aspect, additional encryption (e.g., public/private key pair) is used to encrypt the transmission of the projector public ID public keys from the theater 403 to the content distribution server 100. For example, a public key of the content distribution server 100 may be used to encrypt public keys of the projectors 405 and 406. The content distribution server 100 may then use the corresponding private key to decrypt the encrypted public keys of the projectors 405 and 406. Other forms of encryption and/or data security may be used instead of public/private key configurations to securely transmit the projector public ID public keys from the theater 403 to the content distribution server 100.

In one aspect, the blockchain 200 is cached locally in a database 410 stored at, or in operable communication with, the theater 403. A transaction server 411 may provide updates to the blockchain 200 directly at the database 410 or may, alternatively, send the blockchain updates to the content distribution server 100. In another aspect, the blockchain 200 may be stored in a decentralized network of computing devices that is in operable communication with the theater 403.

By having one blockchain 200 that is uniquely associated with particular content 106 (e.g., a movie), the content distribution server 100 is able to effectively manage and preserve the lifecycle of the content 106. For example, the content distribution server 100 may re-release the content 106 with existing and/or updated usage rights.

In yet another aspect, multiple movies may be stored in one blockchain 200. For example, a new block may be added to the end of the blockchain 200 to demarcate a new portion of the blockchain 200 for a subsequent movie (i.e., a new payload update).

In another aspect, the blockchain 200 may be used to track tickets sold for particular playbacks corresponding to certain projectors. For example, a ticketing system located at, or in operable communication with, the theater 403 may add transactions to the blockchain 200.

The blockchain content distribution system 400 illustrated in FIG. 4 allows for record, receipt, and playback operations to be performed with respect to an independent blockchain 200 per title (e.g., movie, television show, video game, etc.). Requests are communicated between the content distribution server 100 and the theater 403 via secure two-way communication configurations such as public/private key encryption.

Figure 5:
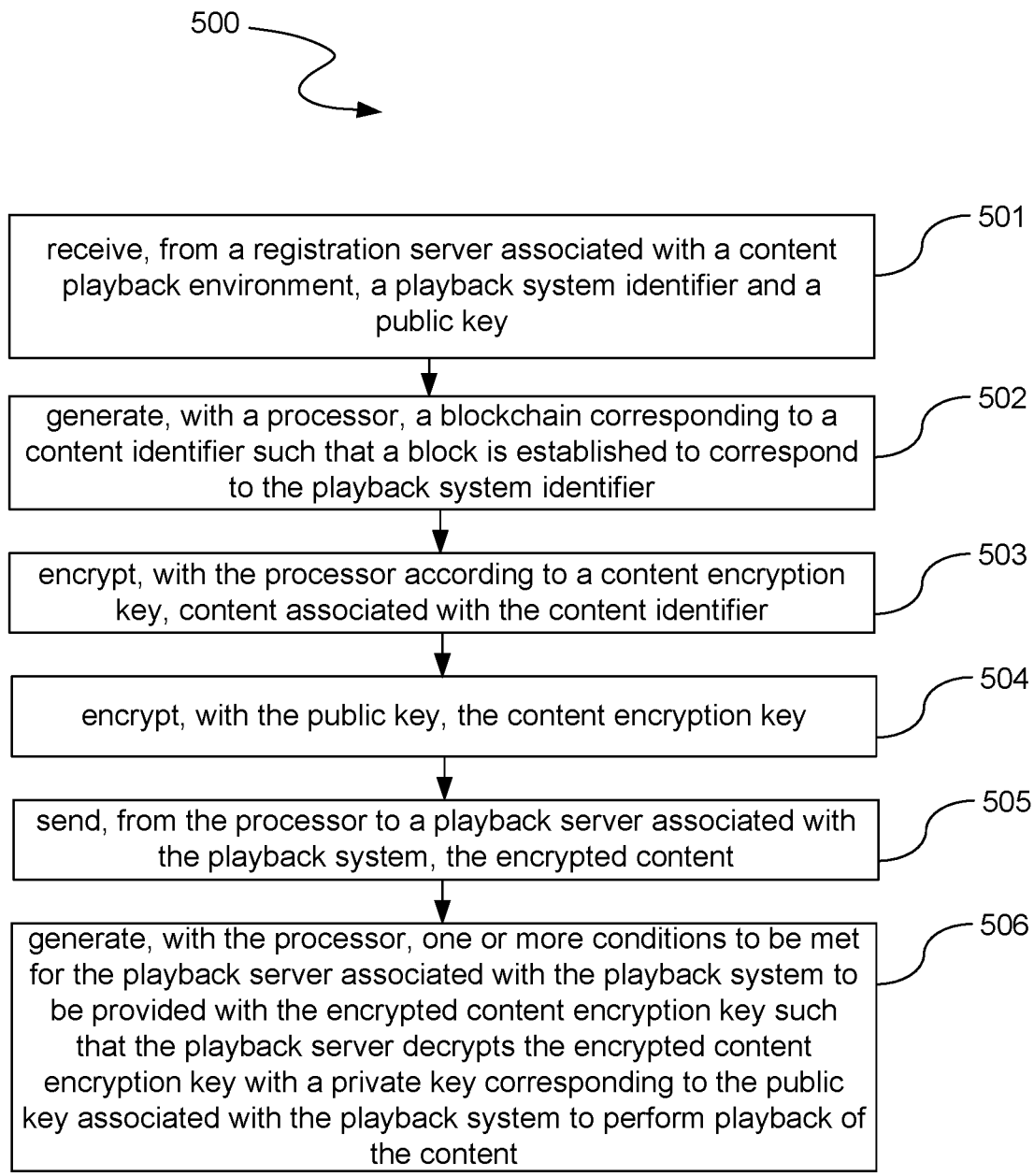
FIG. 5 illustrates a process that may be used by the blockchain CDS illustrated in FIG. 4 to unlock access to the encrypted DCP.

FIG. 5 illustrates a process 500 that may be used by the blockchain content distribution system 400 illustrated in FIG. 4 to unlock access to the encrypted DCP 401. At a process block 501, the process 500 receives, from the registration server 404 associated with a content playback environment, a playback system identifier and a public key. The playback system identifier and the public key correspond to a playback system. Further, at a process block 502, the process 500 generates, with the processor 101 (FIG. 1), a blockchain corresponding to a content identifier such that a block is established to correspond to the playback system identifier. In addition, at a process block 503, the process 500 encrypts, with the processor 101 according to a CEK, content associated with the content identifier. At a process block 504, the process 500 encrypts, with the public key, the CEK.

Further, at a process block 505, the process 500 sends, from the processor 101 to a playback server associated with the playback system, the encrypted content. In addition, at a process block 506, the process 500 generates, with the processor 101, one or more conditions to be met for the playback server associated with the playback system to be provided with the encrypted CEK such that the playback server decrypts the encrypted content encryption key with a private key corresponding to the public key associated with the playback system to perform playback of the content. Fulfillment of the conditions is determined by one or more updates to the blockchain 200 (FIG. 2).

Figure 6:
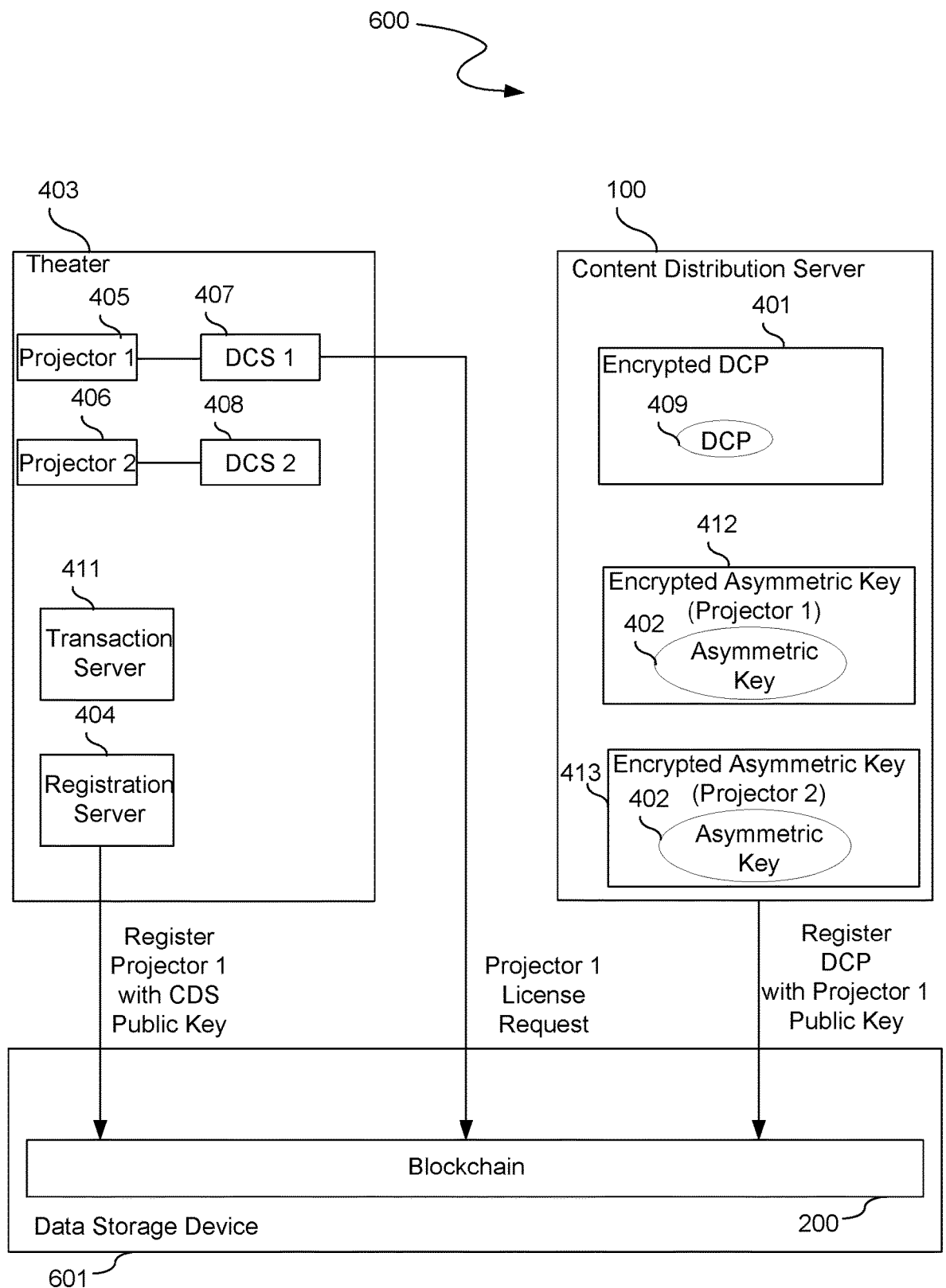
FIG. 6 illustrates a blockchain CDS that may be used by the CDS illustrated in FIG. 1 to unlock access to an encrypted DCP without the two-way encrypted communication illustrated in FIG. 4

Alternatively, a blockchain CDS 600 illustrated in FIG. 6 may be used by the content distribution server 100 illustrated in FIG. 1 to unlock access to an encrypted DCP 401 without the two-way encrypted communication illustrated in FIG. 4. In other words, the blockchain CDS 600 generates communication directly in the blockchain 200 rather than between the theater 403 and the content distribution server 100. For example, rather than registering a projector with the content distribution server 100, the theater 403 may use a public key of the content distribution server 100 to register the projector 405 at the blockchain 200. The content distribution server 100 may then use the corresponding private key to decrypt the registration request, which may include a projector profile and/or various data pertaining to the registration of a particular projector 405 on the blockchain 200. Further, one or more data storage devices 601 may store one or more copies of the blockchain 200.

After registration of the projector 405 at the blockchain 200, the content distribution server 100 may use the public key of the projector 405 to register content at the blockchain 200 for playback by the projector 405 (e.g., the movie corresponding to the blockchain 200). The projector 405 then initiates a license request at the blockchain 200 using the public key of the content distribution server 100. In one aspect, the projector 405 may provide a token (e.g., via the blockchain 200) to obtain a license. If no playback occurs within a certain time threshold, a token refund request may be performed via the blockchain 200. For example, the token refund request may be recorded at the blockchain 200 with the public key of the content distribution server 100 so that the content distribution server 100 may automatically read and perform the token refund request upon decryption with the private key of the content distribution server 100.

Figure 7:
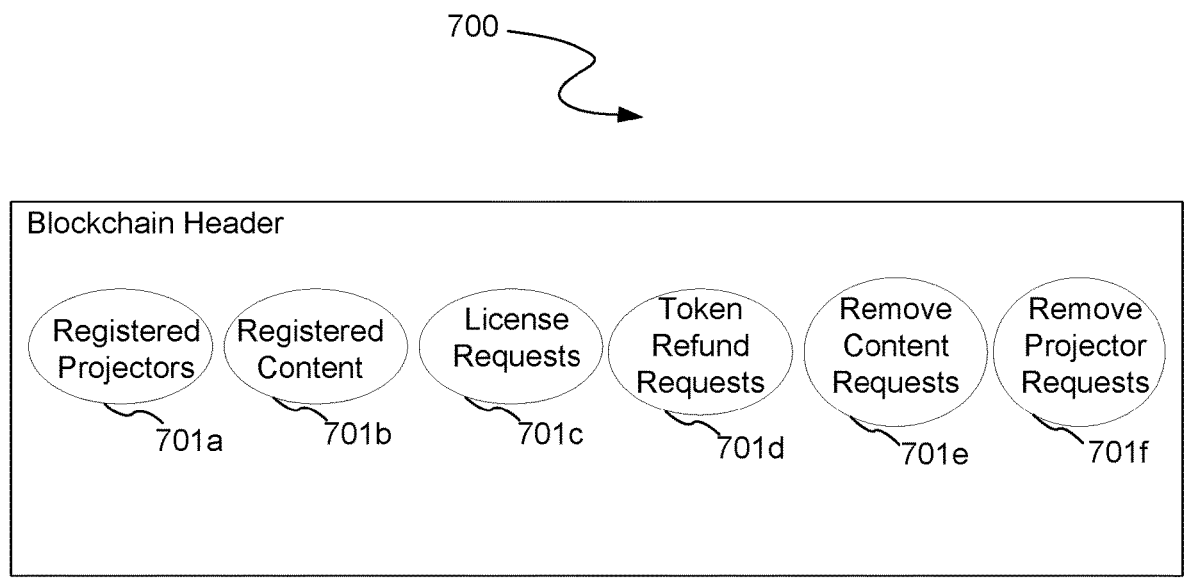
FIG. 7 illustrates an example of a header for the blockchain used by the blockchain CDS illustrated in FIG. 6.

FIG. 7 illustrates an example of a header 700 for the blockchain 200 used by the blockchain CDS 600 illustrated in FIG. 6. The header 700 may identify information for the type of transaction that is recorded in the blockchain 200. Accordingly, a computer may select from a category 701a-701f to efficiently search the blockchain 200. For instance, the computer may select the registered projectors category 701, which may be a data structure, set of pointers, etc., to search for only the transactions in the blockchain 200 that contain registered projector transactions. Accordingly, the configurations provided herein improve the search time for transactions associated with secure content playback.

Figure 8:
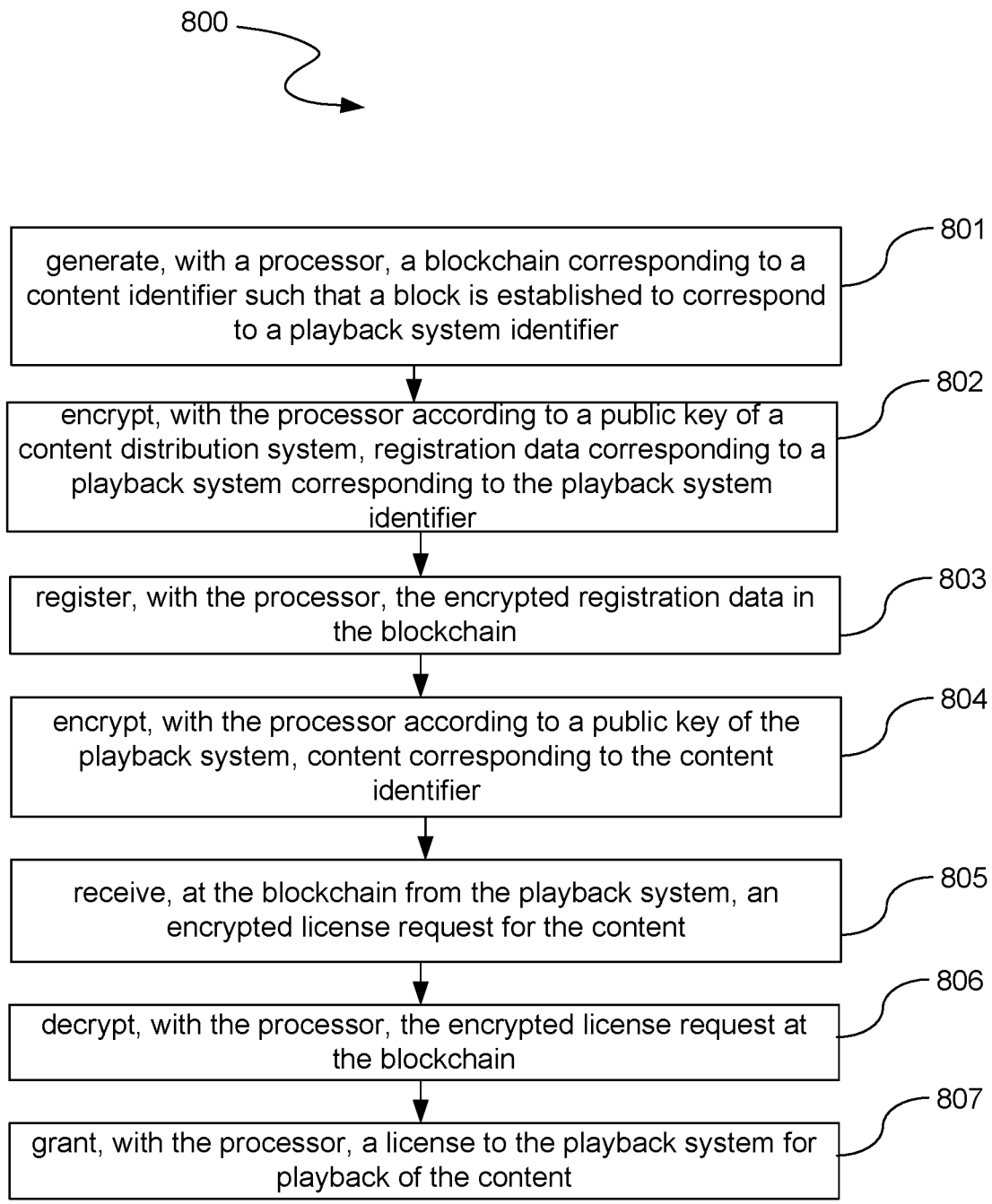
FIG. 8 illustrates a process that may be used by the blockchain CDS illustrated in FIG. 6 to unlock access to the encrypted DCP.

FIG. 8 illustrates a process 800 that may be used by the blockchain CDS 600 illustrated in FIG. 6 to unlock access to the encrypted DCP 401. At a process block 801, the process 800 generates, with the processor 101 (FIG. 1), a blockchain 200 (FIG. 6) corresponding to a content identifier such that a block is established to correspond to a playback system identifier. Further, at a process block 802, the process 800 encrypts, with the processor 101 according to a public key of a CDS, registration data corresponding to a playback system corresponding to the playback system identifier. In addition, at a process block 803, the process 800 registers, with the processor 101, the encrypted registration data in the blockchain 200. At a process block 804, the process 800 encrypts, with the processor 101 according to a public key of the playback system, content corresponding to the content identifier. Further, at a process block 805, the process 800 receives, at the blockchain 200 from the playback system, an encrypted license request for the content. The license request is encrypted according to the public key of the content distribution system. In addition, at a process block 806, the process 800 decrypts, with the processor 101, the encrypted license request at the blockchain 200. At a process block 807, the process 800 grants, with the processor 101, a license to the playback system for playback of the content.

Figure 9:
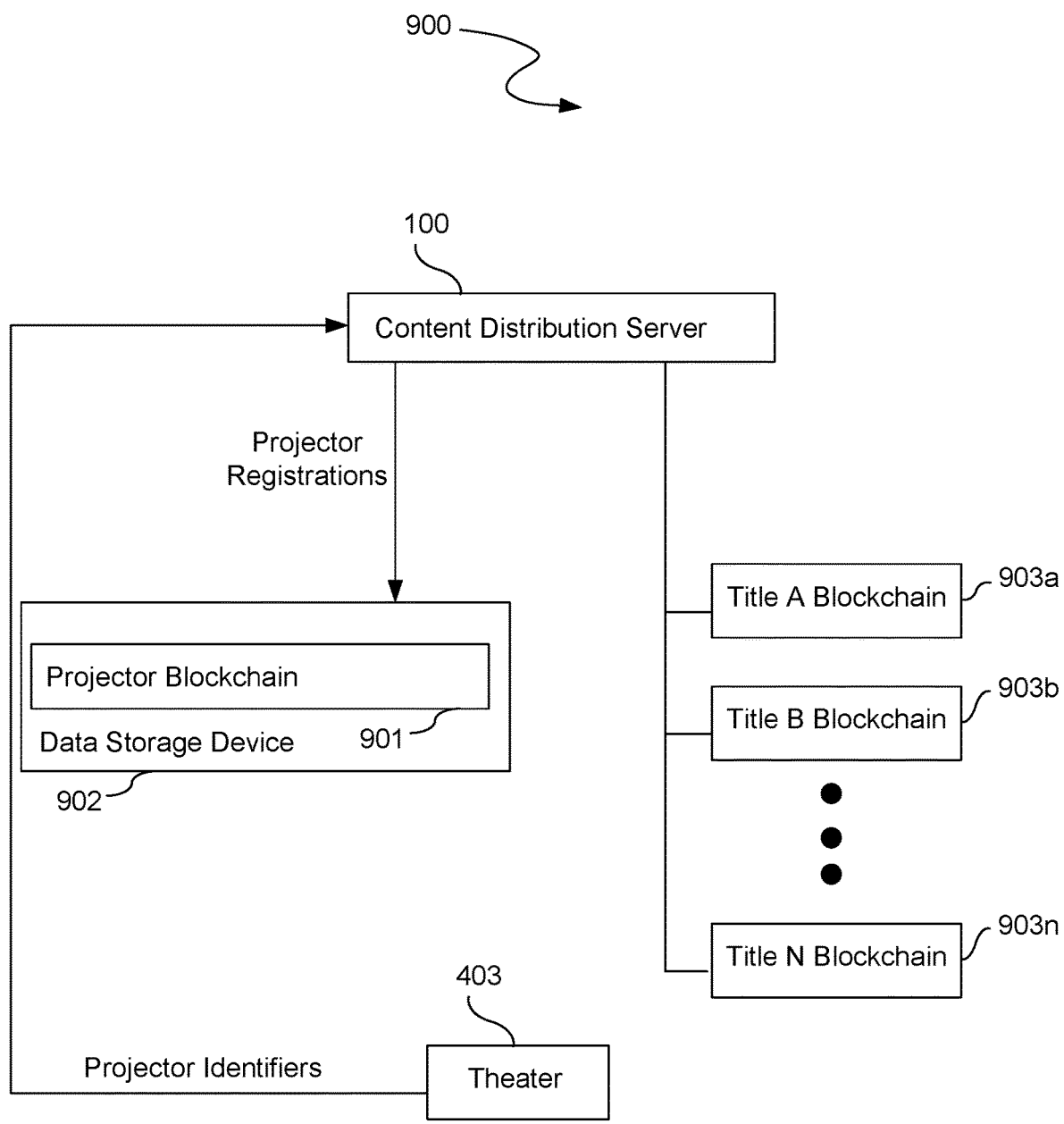
FIG. 9 illustrates a master index system that may be used to avoid registration of a projector for content in the blockchain illustrated in FIG. 2.

FIG. 9 illustrates a master index system 900 that may be used to avoid registration of a projector for each content item in the block chain 200 illustrated in FIG. 2. For instance, a projector blockchain 901, which may be stored on a data storage device 902, is a master index of projector identifiers. The content distribution server 100 may receive the projector identifiers from the theater 403 and then record the projector identifiers as transactions in the projector blockchain 901. In one aspect, the content distribution server 100 uses the public keys of the corresponding projectors generated by the theater 403 to encrypt the transactions in the projector blockchain 901 (i.e., the recording of the projector identifiers).

The content distribution server 100 also generates a plurality of title blockchains 903a-903n that each correspond to a particular content title (e.g., movie, television show, video game, etc.). By registering a projector identifier in the projector blockchain 901, the content server 100 allows the theater 403 to directly record transactions for a registered projector at any of the title blockchains 903a-903n. The theater 403 may then perform any of the blockchain transactions provided herein at any of the title blockchains 903a-903n without having to register a projector at each of the title blockchains 903-903n.

Figure 10:
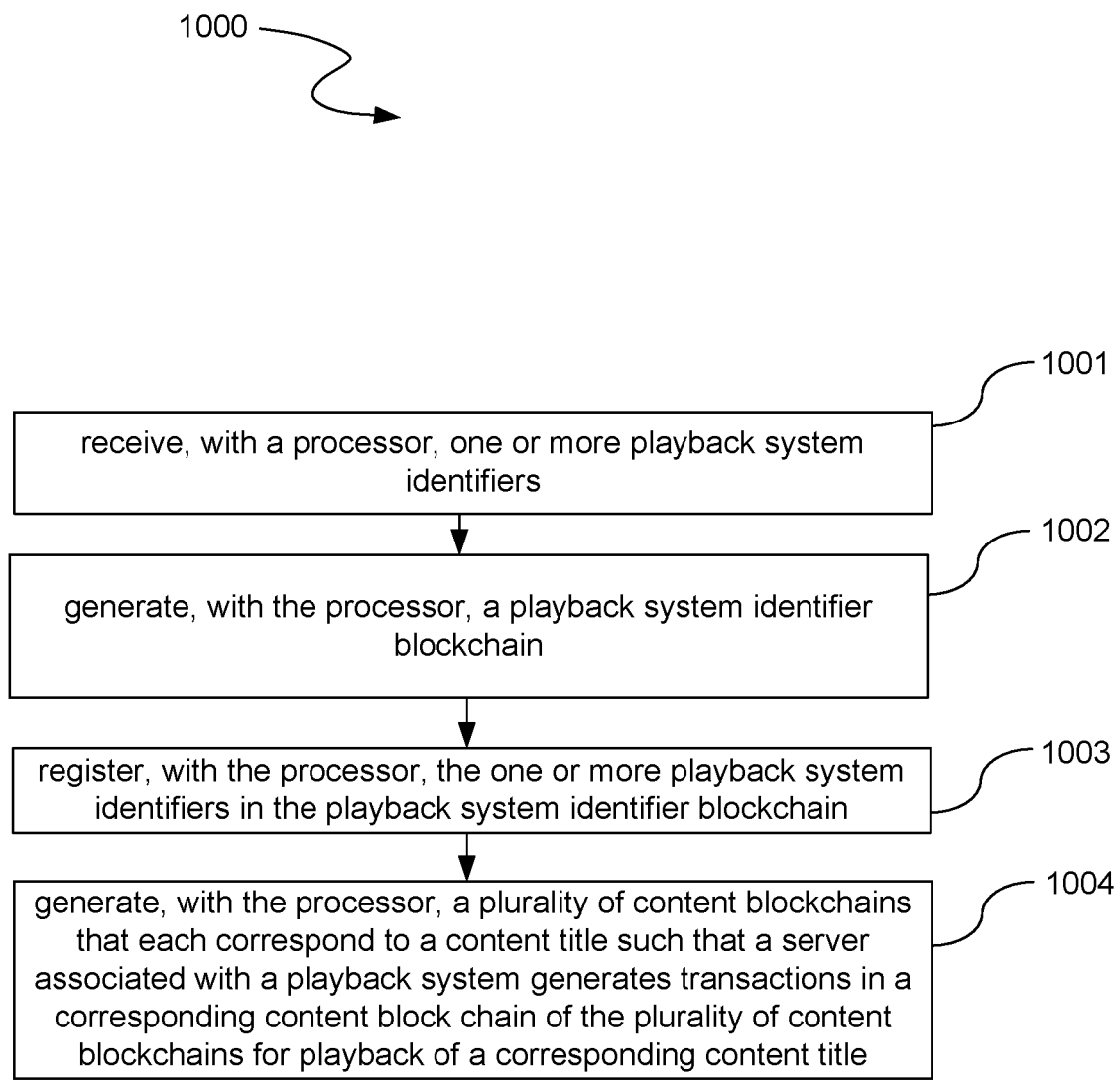
FIG. 10 illustrates a process that may be used by the master index system of FIG. 9 to generate the projector blockchain.

FIG. 10 illustrates a process 1000 that may be used by the master index system 900 of FIG. 9 to generate the projector blockchain 902. At a process block 1001, the process 1000 receives, with the processor 101 (FIG. 1), one or more playback system identifiers. Further, at a process block 1002, the process 1000 generates, with the processor 101, a playback system identifier blockchain. In addition, at a process block 1003, the process 1000 registers, with the processor 101, the one or more playback system identifiers in the playback system identifier blockchain. At a process block 1004, the process 1000 generates, with the processor 101, a plurality of content blockchains that each correspond to a content title such that a server associated with a playback system generates transactions in a corresponding content blockchain of the plurality of content blockchains for playback of a corresponding content title. The playback system corresponds to a registered playback system identifier in the one or more registered playback system identifiers.

The processes described herein may be implemented in a specialized, general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
   receiving, from a registration server associated with a content playback environment, a playback system identifier and a public key, the playback system identifier and the public key corresponding to a playback system;
   generating a blockchain corresponding to a content identifier such that a block is established to correspond to the playback system identifier, wherein the blockchain is uniquely associated with the content identifier, and wherein each of a plurality of blocks of the blockchain is uniquely associated with a respective one of a plurality of playback system identifiers including the playback system identifier;

encrypting, according to a content encryption key, content associated with the content identifier;

encrypting, with the public key, the content encryption key;

sending to a playback server associated with the playback system, the encrypted content; and generating one or more conditions to be met for the playback server associated with the playback system to be provided with the encrypted content encryption key such that the playback server decrypts the encrypted content encryption key with a private key corresponding to the public key associated with the playback system to perform playback of the content, wherein a fulfillment of the one or more conditions is determined by one or more updates to the blockchain;

wherein the blockchain comprises a blockchain code to automatically determine the fulfillment of the one or more conditions, and automatically provide a notification of the fulfillment of the one or more conditions such that the encrypted content encryption key is sent to the playback server associated with the playback system.

2. The method of claim 1, wherein the content encryption key is an asymmetric key.

3. The method of claim 1, wherein the one or more conditions comprise installation of the content at the playback server.

4. The method of claim 1, wherein the one or more conditions further comprise the content being received at the playback server.

5. The method of claim 1, wherein the one or more conditions further comprise an attempted screening of the content.

6. A method comprising:
generating a blockchain corresponding to a content identifier such that a block is established to correspond to a playback system identifier;

encrypting, according to a public key of a content distribution system, registration data corresponding to a playback system corresponding to the playback system identifier;

registering the encrypted registration data in the blockchain;

encrypting, according to a public key of the playback system, content corresponding to the content identifier;

receiving, at the blockchain from the playback system, an encrypted license request for the content, the license request being encrypted according to the public key of the content distribution system; and decrypting the encrypted license request at the blockchain;

wherein the blockchain comprises a blockchain code to automatically determine a fulfillment of one or more conditions to be met for providing a license for playback of the content, and automatically provide a notification of the fulfillment of the one or more conditions to grant the license to the playback system for playback of the content.

7. The method of claim 6, further comprising:
generating a header for the blockchain that stores one or more categories of transactions corresponding to one or more transaction types.

8. The method of claim 7, further comprising:
searching for a transaction in the blockchain according to a category from the one or more categories stored in the header.

9. The method of claim 6, further comprising:
generating a token in conjunction with the grant of the license.

10. The method of claim 6, further comprising:
removing the encrypted content from the blockchain.

11. The method of claim 6, further comprising:
deregistering the encrypted registration data in the blockchain such that the playback system is unable to perform playback of the content.

12. The method of claim 6, further comprising:
determining a version of the playback system.

13. A method comprising:
generating a blockchain corresponding to a content identifier such that a block is established to correspond to a playback system identifier;

encrypting, according to a public key of a content distribution system, registration data corresponding to a playback system corresponding to the playback system identifier;

registering the encrypted registration data in the blockchain;

encrypting, according to a public key of the playback system, content corresponding to the content identifier;

receiving, at the blockchain from the playback system, an encrypted license request for the content, the license request being encrypted according to the public key of the content distribution system;

decrypting the encrypted license request at the blockchain;

receiving a token refund request encrypted according to the public key of the content distribution system;

decrypting, according to a private key corresponding to the public key of the content distribution system, the encrypted token refund request; and automatically providing a token refund if playback has not occurred within a predetermined time threshold.

14. A method comprising
receiving one or more playback system identifiers;
generating a playback system identifier blockchain;
registering the one or more playback system identifiers in the playback system identifier blockchain; and
generating a plurality of content blockchains that each corresponds to a content title;

wherein each of the plurality of content blockchains comprises a blockchain code to automatically determine a fulfillment of one or more conditions to be met for generating transactions in a corresponding content blockchain of the plurality of content blockchains for playback of a corresponding content title, and automatically provide a notification of the fulfillment of the one or more conditions to allow a server associated with a playback system to generate the transactions in the corresponding content blockchain of the plurality of content blockchains for playback of the corresponding content title, the playback system corresponding to a registered playback system identifier in the one or more registered playback system identifiers.

15. The method of claim 14, further comprising:
registering the one or more playback system identifiers according to a corresponding public key of an associated playback system.

* * * * *